July 31, 1928.

S. I. FEKETE ET AL 1,679,025

BODY FOR AUTOMOBILES

Filed Jan. 2, 1925

S. I. FEKETE ET AL 1,679,025

BODY FOR AUTOMOBILES

Filed Jan. 2, 1925

Patented July 31, 1928.

1,679,025

UNITED STATES PATENT OFFICE.

STEPHEN I. FEKETE AND MILLARD H. TONCRAY, OF DETROIT, MICHIGAN, ASSIGNORS TO HUDSON MOTOR CAR COMPANY, OF DETROIT, MICHIGAN, A CORPORATION OF MICHIGAN.

BODY FOR AUTOMOBILES.

Application filed January 2, 1925. Serial No. 97.

Our invention relates to bodies for automobiles and particularly to so-called closed bodies of the type sometimes called a coupé having a passenger compartment in front and a rear deck or luggage compartment behind. The particular object of the invention is to provide a body of this type the rear deck compartment of which will be more accessible than the bodies as heretofore constructed and which will have other advantages which will be apparent from the following description.

Automobile bodies for one or two passengers commonly known as coupé or cab bodies have in the past been constructed with a built-in bench seat, the back of which is against the rear wall of the driver's compartment and have also been provided with a rear deck compartment for luggage which has been accessible only from the outside by lifting a trap door or through side openings or by lifting the entire cover or roof of the compartment. In any case, it has been necessary to provide locks for the doors of the rear deck compartment and to keep the compartment locked to prevent theft of articles contained in it. These compartments have usually been accessible from the rear and as it is customary to carry the spare tire on the rear of the vehicle, it has been necessary for the user to lean over or around the tire to obtain access to the compartment. This requires stretching, particularly by a person of short stature and renders it difficult to reach or arrange articles in the compartment. Also since the rear tire becomes spattered with mud and oil the clothes of the user usually get soiled.

The body embodying our present invention overcomes all these difficulties by providing a body having a closed front compartment containing one or two movable seats and having an opening through the rear wall of the driver's compartment into the rear deck compartment. The rear deck compartment is preferably made permanently closed so that access to its contents can be had only through the driver's compartment. Therefore, when the doors of the driver's compartment are locked, the articles in the rear compartments are protected against theft.

Furthermore, since the seats are movable and can be placed somewhat in front of the rear wall of the driver's compartment, there is a space left in the driver's compartment of a shape convenient to receive golf clubs, suit cases or parcels which the user does not care to put into the rear deck compartment. The body is therefore handy for shoppers, salesmen and similarly used for people who have occasion to carry baggage or parcels. The body also has all the advantages of having movable seats, the position of which may be adjusted in accordance with the convenience of the user.

The invention will be fully understood from the following description when taken in connection with the accompanying drawings, and the novel features thereof will be pointed out and clearly defined in the claims at the close of this specification.

Figure 1:
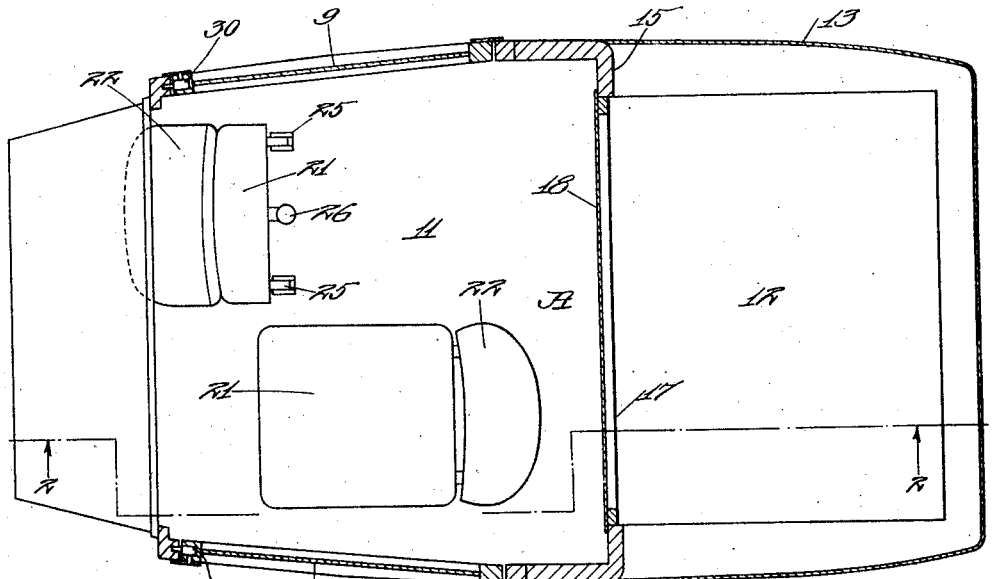
Fig. 1 is a sectional plan view of a body embodying our invention in its preferred form.
Figure 2:
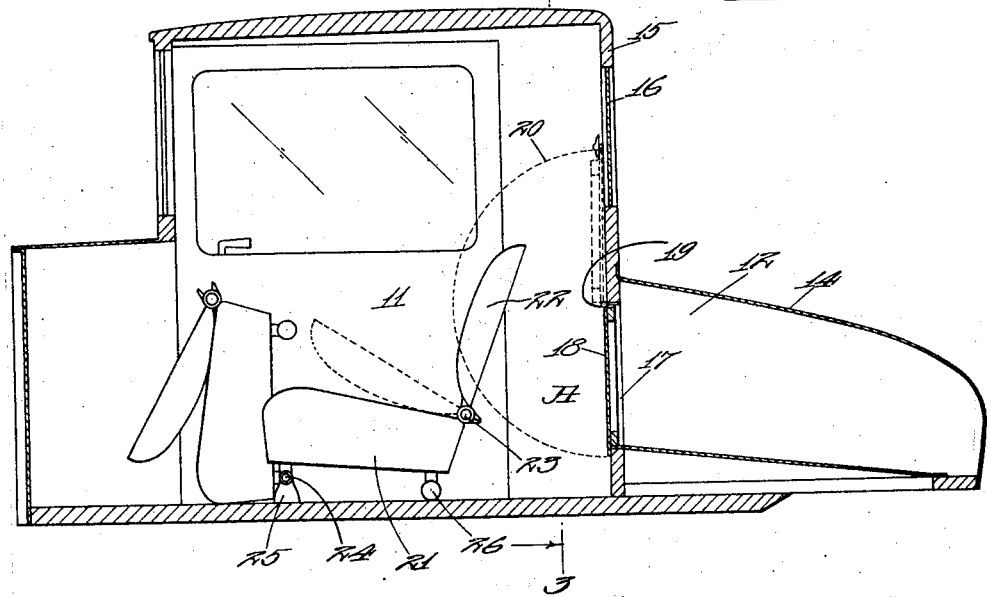
Fig. 2 is a vertical section on line 2—2, Fig. 1.
Figure 3:
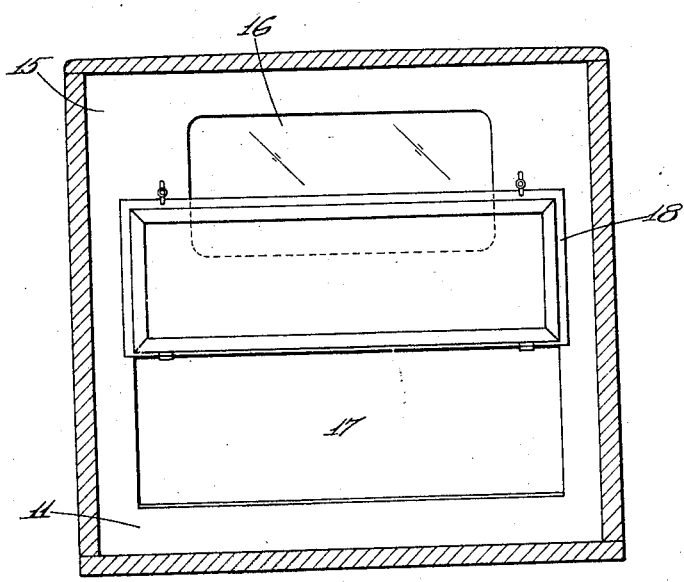
Fig. 3 is a sectional view looking toward the rear, taken on line 3—3, Fig. 2, and shows the relation of the opening into the rear compartment and the rear window.

Referring now to the drawings, the body is constructed with a driver's compartment 11 and a rear deck compartment 12 for luggage or the like. The rear deck compartment is closed by side walls 13 and top 14, the closure being preferably, but not necessarily permanent. The rear wall 15 of the driver's compartment 11 is provided with a window 16 and below the window an opening 17 which gives access through the driver's compartment 11 to the rear deck compartment 12. This opening 17 is closed by a door 18 hinged horizontally at 19 along its top edge. The dotted semi-circle 20 (Fig. 2) indicates the path of movement of the edge of the door as it is opened and shut. In the front compartment is a driver's seat and a second seat, both of which are movable to get them out of the way of the door 18, which closes the rear deck compartment. Each seat is provided with a cushioned seat 21 and back 22 hinged at 23 to the seat. Each seat is also hinged at 24 to brackets 25, these brackets being locatable in the compartment to suit the convenience of the user. Each seat is also provided with a vertically adjustable leg 26 so that the pitch of the seat can be altered as required. It will be seen by turning down the back 22 into the dotted line position shown in Fig. 2, the edge of the rear door 18 will clear the seat and therefore access may be had to the rear deck compartment without turning up either seat. However, if a large package is to be placed in the rear deck compartment, or moved from it, the seat can be turned up in the position shown into the position of the extra passenger seat as shown in Fig. 1 or both seats can be turned up making the rear deck compartment readily accessible through either door of the vehicle. It will also be seen that at the point marked "A" in Figs. 1 and 2, there is a space between the backs of the seats and the rear wall, which extends the full width of the car and which is large enough to receive articles such as golf bags, suit cases, or valises. As the outside doors 8 and 9 are provided with locks 30, and as the rear deck compartment is preferably permanently closed, the contents of the rear deck compartment, as well as the contents of the driver's compartment, are protected against theft. It is also found that the body as actually constructed permits very easy access to the interior of the rear compartment.

What we claim is:—

1. A coupé body for automobiles having a driver's compartment and a rear deck compartment constituting the entire rear portion of the body and permanently closed to the outside, a door controlling communication between the driver's compartment and rear deck compartment, and a seat in said driver's compartment spaced forwardly of said door and having a portion movable out of the path of movement of said door in opening and closing.

2. A body for automobiles having a driver's compartment and a rear deck compartment occupying the entire rear portion of the body, a partition having an opening between the two compartments, a horizontally hinged door to close said opening and seats in the driver's compartment movable out of the path of said door.

In testimony whereof we affix our signatures.

STEPHEN I. FEKETE.
MILLARD H. TONCRAY.